United States Patent
Li et al.

(10) Patent No.: US 12,337,240 B2
(45) Date of Patent: Jun. 24, 2025

(54) METHOD FOR INTERACTIVE PLOT JUMPING, METHOD FOR DISPLAYING INTERACTIVE PLOT INTERFACE, APPARATUS, AND DEVICE

(71) Applicant: TENCENT TECHNOLOGY (SHENZHEN) COMPANY LIMITED, Shenzhen (CN)

(72) Inventors: Chenghui Li, Shenzhen (CN); Ying Yang, Shenzhen (CN); Bo Bi, Shenzhen (CN); Qun Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 277 days.

(21) Appl. No.: 17/962,848

(22) Filed: Oct. 10, 2022

(65) Prior Publication Data

US 2023/0033420 A1    Feb. 2, 2023

Related U.S. Application Data

(63) Continuation of application No. PCT/CN2021/123131, filed on Oct. 11, 2021.

(30) Foreign Application Priority Data

Oct. 29, 2020    (CN) .......................... 202011182523.4

(51) Int. Cl.
   *A63F 13/69*    (2014.01)
   *A63F 13/47*    (2014.01)
   *A63F 13/52*    (2014.01)

(52) U.S. Cl.
   CPC .............. *A63F 13/69* (2014.09); *A63F 13/47* (2014.09); *A63F 13/52* (2014.09); *A63F 2300/609* (2013.01); *A63F 2300/632* (2013.01)

(58) Field of Classification Search
   CPC .......... A63F 13/69; A63F 13/47; A63F 13/52; A63F 2300/609; A63F 2300/632;
   (Continued)

(56) References Cited

U.S. PATENT DOCUMENTS

2017/0124733 A1*   5/2017   Boss ....................... G06T 13/80
2019/0105573 A1    4/2019   Benedetto
(Continued)

FOREIGN PATENT DOCUMENTS

| CN | 109794064 A | 5/2019 |
| CN | 111432276 A | 7/2020 |
| CN | 112190949 A | 1/2021 |

OTHER PUBLICATIONS

The World Intellectual Property Organization (WIPO) International Search Report for PCT/CN2021/123131 Jan. 19, 2022 3 Pages (including translation).

*Primary Examiner* — David L Lewis
*Assistant Examiner* — Matthew D Hoel
(74) *Attorney, Agent, or Firm* — ANOVA LAW GROUP, PLLC

(57) ABSTRACT

This application discloses a method for interactive plot jumping, a method for displaying an interactive plot interface, an apparatus, and a device. The method includes obtaining current node information comprising a first plot path that reaches a current node and a plot parameter of the current node, the current node indicating a plot where a user is currently located; obtaining target node information in response to a plot jump instruction for a target node, the plot jump instruction instructing a plot to jump from the current node to the target node; performing path splicing on the first plot path and the historical plot path to obtain a spliced plot path that conforms to a plot logic rule and satisfies a plot parameter condition, the spliced plot path leading to the
(Continued)

target node; and updating the plot parameter corresponding to the target node based on the spliced plot path.

20 Claims, 6 Drawing Sheets

(58) Field of Classification Search
CPC .. A63F 2300/63; A63F 2300/67; A63F 13/44; A63F 13/655; A63F 13/60
See application file for complete search history.

(56) References Cited

U.S. PATENT DOCUMENTS

| | | |
|---|---|---|
| 2020/0112772 A1* | 4/2020 | Kingori .............. H04N 21/8541 |
| 2020/0402539 A1* | 12/2020 | Ding .................... G11B 27/102 |
| 2021/0220736 A1 | 7/2021 | Yang et al. |
| 2023/0115491 A1* | 4/2023 | Hu ..................... G06F 16/9574 |
| | | 715/234 |
| 2024/0058697 A1* | 2/2024 | Zhao ...................... A63F 13/60 |

\* cited by examiner

METHOD FOR INTERACTIVE PLOT JUMPING, METHOD FOR DISPLAYING INTERACTIVE PLOT INTERFACE, APPARATUS, AND DEVICE

RELATED APPLICATIONS

This application is a continuation application of PCT Application No. PCT/CN2021/123131, filed on Oct. 11, 2021, which claims priority to Chinese Patent Application No. 202011182523.4, entitled "METHOD FOR INTERACTIVE PLOT JUMPING, METHOD FOR DISPLAYING INTERACTIVE PLOT INTERFACE, APPARATUS, AND DEVICE" and filed on Oct. 29, 2020. The two applications are both incorporated herein by reference in its entirety.

FIELD OF THE TECHNOLOGY

This application relates to the field of computer technologies, and in particular, to a method for interactive plot jumping, a method for displaying an interactive plot interface, an apparatus, and a device.

BACKGROUND OF THE DISCLOSURE

Interactive movie games are an interactive combination of movie and game elements, including mobile games, web games, and terminal games, which are modified based on film and television works. The interactive movie game unfolds the game plot in the form of video. The game plot has multiple branches. As the plot develops, different options will be displayed for the player to make reasonable choices. The plot will go to different branches with the player's choice, different video contents will be played.

The path splicing solution implemented in the related art often has a spliced plot path that is not logical.

SUMMARY

Embodiments of this application provide a method for interactive plot jumping, a method for displaying an interactive plot interface, an apparatus, and a device, which can ensure that the path obtained by splicing is logically smooth while reducing the impact on plot parameters. The technical solutions are as follows.

One aspect of this application provides a method for interactive plot jumping. The method is executed by a computer device. The method includes obtaining current node information comprising a first plot path that reaches a current node and a plot parameter of the current node, the current node indicating a plot where a user is currently located, and the plot parameter reflecting a user status of the user at the current node; obtaining target node information in response to a plot jump instruction for a target node, the target node information comprising a plot parameter of the target node and a historical plot path by which the target node has been reached, and the plot jump instruction instructing a plot to jump from the current node to the target node; performing path splicing on the first plot path and the historical plot path to obtain a spliced plot path that conforms to a plot logic rule and satisfies a plot parameter condition, the spliced plot path leading to the target node; and updating the plot parameter corresponding to the target node based on the spliced plot path.

Another aspect of this application provides a method for displaying an interactive plot interface is provided. The method is executed by a computer device. The method includes displaying a current node and a first plot path that reaches the current node in a plot structure interface, the current node indicating a plot where a user is currently located; obtaining, in response to a plot jump operation for a target node, a plot parameter of the current node and a historical plot path by which the target node has been reached, the plot jump operation instructing a plot to jump from the current node to the target node; performing path splicing on the first plot path and the historical plot path, and displaying a spliced plot path obtained by the splicing, the first plot path being spliced with the historical plot path when the plot parameter of the current node satisfies a plot parameter condition, to obtain the spliced plot path leading to the target node and conforming to a plot logic rule; and updating and displaying a plot parameter corresponding to the target node based on the plot parameter of the current node and the spliced plot path.

Another aspect of this application provides a non-transitory computer-readable storage, storing at least one instruction, at least one program, a code set or an instruction set, and the at least one instruction, the at least one program, the code set, or the instruction set being loaded and executed by a processor to implement the method for interactive plot jumping described above.

The technical solutions provided in the embodiments of this application may bring the following beneficial effects:

Based on the latest path that has reached the current node and the latest plot parameter and on the premise of ensuring that both the plot logic rule and the plot parameter condition are satisfied, the current path and the historical path are spliced to obtain a spliced plot path that conforms to the plot logic rule and satisfies the plot parameter condition. Embodiments of the present disclosure ensure that a new path after the jumping operation will not cause the problem of unreachable spliced path due to the existence of determination nodes, and that the spliced path satisfies maximum parameter changes, thereby effectively maintaining the latest plot state.

It is to be understood that, the foregoing general descriptions and the following detailed descriptions are merely for illustration and explanation purposes and are not intended to limit this application.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

Figure 1:
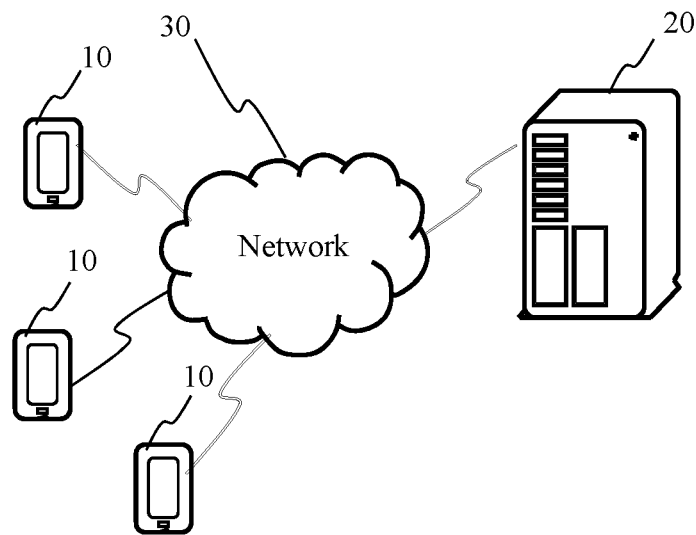
FIG. 1 is a schematic diagram of an application running environment according to an embodiment of this application.

To make objectives, technical solutions, and advantages of this application clearer, the following further describes implementations of this application in detail with reference to the accompanying drawings. The implementations described in the following exemplary embodiments do not represent all implementations that are consistent with this application. On the contrary, the implementations are merely examples of methods that are described in detail in the appended claims and that are consistent with some aspects of this application.

First, the related terms involved in the embodiments of this application are explained to facilitate the understanding of a person skilled in the art.

Interactive movie game or an interactive film, refers to an interactive combination of movie and game elements. Interactive movie games include game products such as mobile games, web games, and terminal games that are modified based on film and television works. In a game, a plot has multiple branches. As the plot develops, different options will be displayed for the player to make reasonable choices. The plot will go to different branches with the player's choice, different video contents will be played. In addition to pictures, dynamic images, and videos, the screen of the interactive movie game also includes game-like rules and methods such as common options, interactive options, and loop options, as well as game running programs. Common options and loop options are general options. There are only several interactive options, mainly including role switching, decryption, dialog selection, quick response event (QTE). The quick response event refers to an interactive event requiring the user to perform an operation (such as a touch operation or voice operation) within a certain period of time according to an instruction to guide the action of the role, thereby affecting the progress of the story. In some embodiments, the above options may be text options, voice options, or picture options, which are not limited in the embodiments of this application.

Plot node is a general term for attribute sets including plot video blocks, plot options, parameter change operations, and parameter determination operations. In some embodiments, a plot node has one or more exit nodes. An exit node may be actively selected according to an option on the node, or may be automatically selected according to a value determination. In some embodiments, an exit node of a plot node refers to a node that follows and is closest to the plot node. In some embodiments, there are no other plot nodes between a plot node and an exit node of the plot node.

Plot option is a control for the player to choose the plot. Each plot option corresponds to a different plot branch, or leads to different plot nodes. The player can make reasonable choices. The plot will go to different branches with the player's choice, and therefore, go to different endings. The user may select a target plot option from multiple plot options. Correspondingly, the client may obtain a selection instruction performed on the target plot option, the selection instruction performed on the target plot option being used for instructing to play a plot video corresponding to the target plot option. The target plot option may be any of the multiple plot options.

Storyline is a collection of plot nodes.

Plot parameter is a global variable. Some plot nodes perform a parameter change operation and a parameter determination operation on value variables of such parameters. The plot parameters may include a plot parameter when the user reaches the plot corresponding to the plot node. For example, the plot parameter may include a prop parameter, a favorability value, and other parameter values. In addition, the plot parameter may also include determination information on a plot path, for example, may include parameter determination information on the plot path, determination information for entering a next game plot, prop acquisition determination information, and so on.

Logical reachability is a relationship between adjacent nodes, reflecting that a path from one node to a next node conforms to a logical rule. For example, from a node a to a next node b, if a parameter of the node a satisfies a value determination condition for reaching the node b, or no value determination operation is performing when the node b is reached, it is considered that the node b is logically reachable by the node a; otherwise, the node b is not logically reachable by the node a.

Path refers to a node set formed by several adjacent and logically reachable nodes connected in series.

Path identifier refers to a unique identifier that identifies a path, and is represented by an integer number. In some embodiments, the path corresponding to the path identifier can be updated. For example, if the user goes from a plot node a to a next plot node b, then the path is [a, b], and correspondingly, the path identifier may be 1. When the user continues to go to a next plot node c on the path 1, the plot node set corresponding to the path 1 is updated to [a, b, c].

Historical path: Each plot node stores a latest path by which the player reaches the plot node as the historical path.

Root node is a node corresponding to the first video block, and no other nodes can lead to the root node.

Current node is a plot node corresponding to a plot where the player is currently located; or, may be a node corresponding to a video block that the player is watching.

Current path: A player reaches the current node from the root node by selecting some plot nodes (watching some plots), and a path composed of these plot nodes is defined as the current path.

Intersection node refers to a same plot node that is on two or more paths.

Backtracking operation is an operation performed by the player to jump from the current node to another plot node on the current path.

Jumping operation is an operation performed by the player to jump from the current node to another node that are not on the current path among all the nodes that the player has passed.

Target node is a plot node that the user intents to go to in the jumping operation and the backtracking operation.

Current state reflects the value of each plot parameter when the player reaches the current node. There are multiple different paths to reach a node. If the same node is reached by different paths each time, the value of the plot parameter to reach the node may vary.

History state: Each node has a history state, which represents the value of each plot parameter when the player reached the node last time.

Superior-subordinate relationship is a relationship between two nodes. If a node a and nodes after the node a are traversed starting from the node a and a node b can be reached after several nodes, it is considered that the nodes a and b have a superior-subordinate relationship.

Take-off node and target node are terms in the jumping/backtracking operation, the current node before the jumping/backtracking operation is defined as the take-off node, and the node that the player intends to jump/backtrack to is defined as the target node.

In some embodiments, a client of a game product may display a plot structure display page, where the plot structure display page includes a plurality of plot nodes. The plot node corresponding to a plot where the player is currently located is defined as a current node, and the plot node the player wants to jump to is defined as a target node. The player reaches the current node by selecting a number of plot nodes. A path composed of these plot nodes is defined as a current path. Each plot node stores a latest path by which the player reaches the plot node as a historical path. There is an intersection between the current path and the historical path corresponding to the target node. On the plot structure display page, the user may click a target node different from the current node, and splice a part of the current path before the last intersection with a part of the historical path corresponding to the target node after the last intersection to obtain a spliced plot path for realizing game plot jumping.

FIG. 1 is a schematic diagram of an application running environment according to an embodiment of this application. The application running environment may include: a terminal 10 and a server 20.

The terminal 10 may be an electronic device such as a mobile phone, a tablet computer, a game console, a multimedia playback device, a wearable device, a personal computer (PC), a handheld portable gaming device, and the like. A client of an application may be installed in the terminal 10.

In an embodiment of this application, the application may be any application that can display the screen and options for the user to view and select. Typically, the application is a game application, such as an interactive narrative game, an interactive story game, an interactive video game (e.g., interactive movie), an interactive music game, a graphical adventure game, a role-playing adventure game, and a logic reasoning game. For example, a large game story framework may be set in a game, multiple game plot branches may be set in the game story framework, and these game plot branches may be connected according to a certain plot logic to form a corresponding game story. The player can perform interactive operations in the game. The terminal can develop corresponding game plots based on the player' interactive operations. For example, as the plot develops, different options will be displayed for the player to make reasonable choices. The plot will go to different branches with the player's choice, making the whole game story go to different endings. Of course, in addition to game applications, other types of applications may also display the screen and options for the user to view and select plots. For example, the other types of applications include virtual reality (VR) applications, augmented reality (AR) applications, three-dimensional map programs, military simulation programs, social applications, interactive entertainment applications, etc., which are not limited in the embodiments of this application.

In some embodiments, a client of the application is run in the terminal 10. In some embodiments, the application is an application developed based on a three-dimensional virtual environment engine. For example, the virtual environment engine is a Unity engine. The virtual environment engine can build a three-dimensional virtual environment, virtual objects, and virtual props, etc., to bring users a more immersive gaming experience.

The server 20 is configured to provide a back-end service for the client of the application in the terminal 10. For example, the server 20 may be a back-end server of the application. The server 20 may be a server cluster or a distributed system formed by at least two physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. In some embodiments, the server 20 provides a back-end service for applications in multiple terminals 10 at the same time.

In some embodiments, the terminal 10 may communicate with the server 20 through a network 30.

In the method for interactive plot jumping and the method for displaying an interactive plot interface provided in the embodiments of this application, the steps may be executed by the server 20, by the terminal 10 (e.g., the client of the application running in the terminal 10), or by the terminal 10 and the server 20 that interact and cooperate with each other. For convenience of description, the execution of the steps by a computer device is used as an example in the following embodiments, but this application is not limited thereto.

Next, the technical solution of this application is described by using several embodiments. The technical solution of this application mainly provides a path splicing solution applied in interactive films. This solution performs path splicing based on a current path of a player and a stored historical path by using a specified algorithm. By this solution, when the player performs a jumping/backtracking operation, the latest state of the target node can be updated based on the current state.

Figure 2:
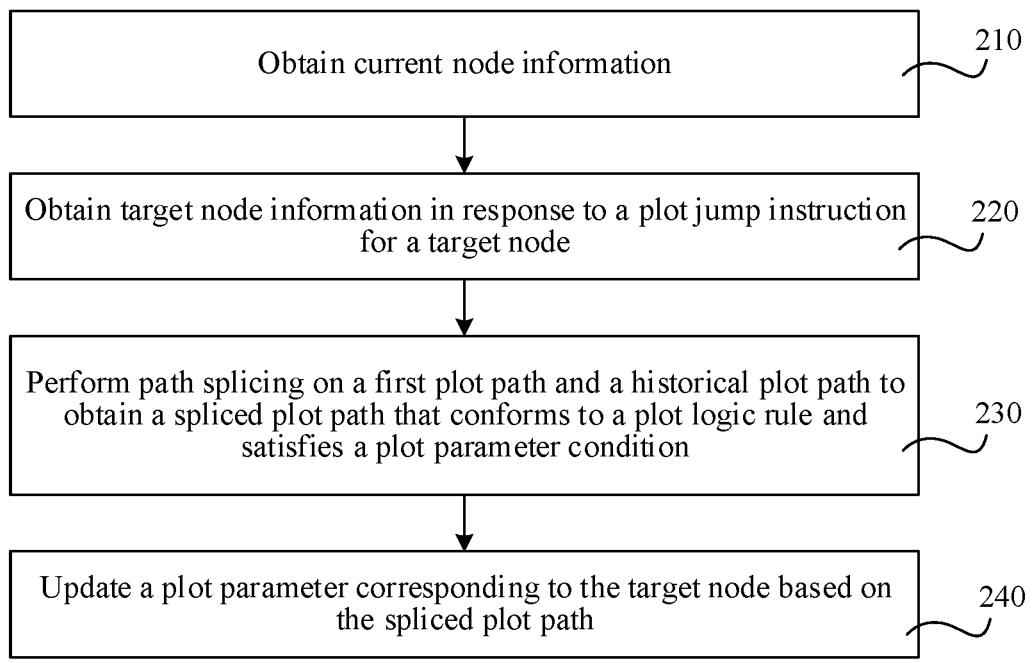
FIG. 2 is a flowchart of a method for interactive plot jumping according to an embodiment of this application.

FIG. 2 is a flowchart of a method for interactive plot jumping according to an embodiment of this application. The method is executed by a computer device. The method may include the following steps (210-240):

Step 210: Obtain current node information.

The current node information includes a first plot path for reaching a current node and a plot parameter of the current node. For the meaning of the plot parameter, reference may be made to the above explanations of the related terms involved in the embodiments of this application.

In some embodiments, the current node is used for indicating a plot where a user is currently located. The first plot path is a current plot path to the current node, which may also be understood as a latest plot path. The plot parameter reflects a user state of the user at the current node. In some embodiments, the first plot path is a plot path from a root node to the current node. In some embodiments, the client is logged in with a user account. In some embodiments, one user account corresponds to one user. In some embodiments, the user state includes a prop parameter, a favorability value, and other parameter values of the user at the current node. The user state may also include historical operation information (such as historical selection information) of the user at the current node.

Step 220: Obtain target node information in response to a plot jump instruction for a target node.

In some embodiments, after receiving a plot jump operation for the target node, the plot jump instruction is generated. The plot jump instruction is used for instructing a plot to jump from the current node to the target node.

In some embodiments, the target node information includes a plot parameter of the target node and a historical plot path by which the target node has been reached. In some embodiments, the historical plot path is a plot path that has reached the target node last time. In some embodiments, the historical plot path includes at least one plot path that has reached the target node.

Step 230: Perform path splicing on a first plot path and a historical plot path to obtain a spliced plot path that conforms to a plot logic rule and satisfies a plot parameter condition.

In some embodiments, the path splicing means splicing or combining some or all of different paths, and a new plot path can be obtained through path splicing. In some embodiments, the spliced plot path leads to the target node. During a path exploration process, the current node may change, so the spliced plot path may or may not pass through the current node. In some embodiments, a logical determination is made on a plot path based on the current node. If it is determined that the plot path does not satisfy the plot logic rule or the plot parameter condition, the spliced plot path does not pass through the current node.

In some embodiments, that the spliced plot path conforms to the plot logic rule means that each plot node in the spliced plot path is logically reachable. For the meanings of logical reachability and logical unreachability, reference may be made to the above explanations of the related terms in the embodiments of this application.

In some embodiments, that the spliced plot path conforms to the plot parameter condition means that the value of the plot parameter of the current node is changed due to the path splicing, but the change in the value falls within a preset range, to modify the plot parameter generated when the user reaches the current node through the first plot path as little as possible, and generate a logically reachable plot path that leads to the target node. Therefore, during path splicing, it is necessary to limit the splicing path from two aspects. One is to ensure that the spliced path is logically reachable, and the other is to ensure that the change to the plot parameter of the current node in the spliced path is as small as possible, to provide a path splicing effect expected by the user, and accurately identify the user's intention.

In one embodiment, the above step 230 may be implemented by the following steps:

Step 231: Perform the path splicing on the first plot path and the historical plot path according to a default splicing rule to obtain a default spliced plot path.

In one embodiment, the above step 231 may be implemented by the following process:

determining plot intersection nodes of the current path and the historical path; obtaining the current path before a last intersection node and the historical path after the last intersection node; and performing path splicing on the current plot path before the last intersection node and the historical plot path after the last intersection node to obtain the default spliced plot path.

Step 232: Perform plot logic verification on the default spliced plot path.

In some embodiments, the plot logic verification is used for detecting whether plot nodes in a plot path are logically reachable to each other. If yes, it may be determined that the path conforms to the plot logic rule; otherwise, it may be determined that the path does not conform to the plot logic rule.

In some embodiments, the result of the above step 232 may have two cases: one is that the default spliced plot path conforms to the plot logic rule, and the other is that the default spliced plot path does not conform to the plot logic rule.

In some embodiments, for the first case, when the default spliced plot path conforms with the plot logic rule, the default spliced plot path is used as the spliced plot path. In this case, it indicates that the default spliced path for jumping from the current node to the target node is relatively simple, and no value determination operation or value change operation is involved, so the default spliced path can be used as a final spliced plot path to realize the jumping between nodes.

For the second case, when the default spliced plot path does not conform to the plot logic rule, the path splicing is performed on the first plot path and the historical plot path based on a superior-subordinate relationship between the current node and the target node, to obtain the spliced plot path that conforms to the plot logic rule and satisfies the plot parameter condition.

In some embodiments, when the default spliced plot path does not conform to the plot logic rule, the historical path cannot be directly used to reach the target node, because the plot parameter obtained by the user at the current node will be erased, failing to achieve the expected plot effect. Therefore, it is necessary to analyze the second case, and choose different path splicing solutions for different scenarios.

The objective of the technical solution provided in this application is to generate a path that can reach the target node on the premise of modifying the current path of the user as little as possible, and to update the latest value of the target node based on the value state at the current node. In one embodiment, there may be different path splicing scenarios depending on whether there is a superior-subordinate relationship between the current node and the target node. One scenario is that the nodes before and after the jumping have a superior-subordinate relationship, and the other scenario is that the nodes before and after the jumping do not have a superior-subordinate relationship. A specific solution is as follows.

It is determined whether a superior-subordinate relationship exists between the current node and the target node. In some embodiments, after determining the superior-subordinate relationship between the current node and the target node, a target determination node is determined in intersection nodes of the first plot path and the historical plot path, the target determination node being a node that causes the default spliced plot path to not conform to the plot logic rule and involves a plot parameter determination.

Scenario 1: There is a superior-subordinate relationship between the current node and the target node.

Step S10: When the superior-subordinate relationship exists between the current node and the target node, perform depth-first search processing in plot nodes before the target node to obtain plot splicing nodes that conform to the plot logic rule. Plot nodes after the current node do not change the plot parameter of the current node.

In one embodiment, since the depth-first search processing (DFS) is a recursive operation, searching a large number of nodes using DFS alone will be time-consuming and occupy relatively large memory space. Therefore, some branch removal operations are required, to remove some nodes that do not need to be traversed. Therefore, before the operation of performing depth-first search processing in the plot nodes before the target node is performed, an operation of optimizing the amount of calculation is performed:

Step S00: Obtain read plot nodes after a target determination node.

The target determination node is a plot node that causes the default spliced plot path to not conform to the plot logic rule and involves a determination of the target plot parameter.

Correspondingly, the above step S10 may be replaced by the following step S1:

S1: Perform the depth-first search processing in the read plot nodes after the target determination node to obtain the plot splicing node that conforms to the plot logic rule.

In this way, the depth-first search processing only needs to traverse the nodes that the user has gone through (that is, the read plot nodes), and the reason is easy to understand: plot nodes that the user has not gone through cannot be created without foundation.

Figure 3:
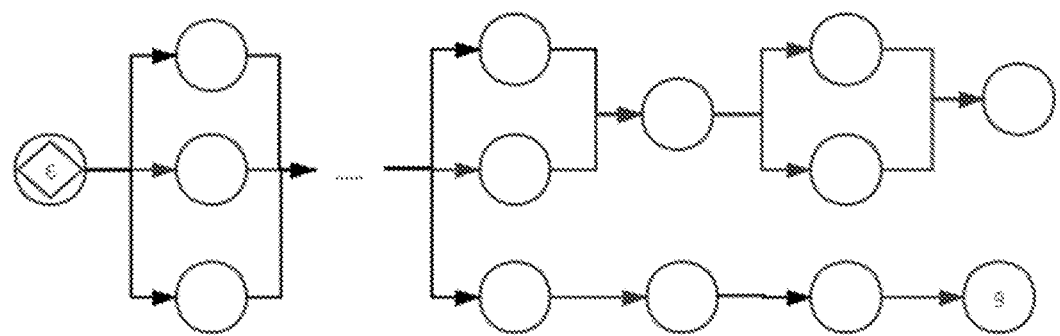
FIG. 3 is a schematic diagram of a plot structure according to an embodiment of this application.

In one embodiment, there is also a case where the plot structure after the determination node is relatively complex. For example, referring to FIG. 3, which shows a schematic diagram of a plot structure. If a determination node 6 is followed by several layers of bifurcation and confluence nodes which the user has reached, finding a path to a target node 9 only by traversing the read plot nodes still has the problem of high recursive complexity. For the case shown in FIG. 3, the recursive complexity will undoubtedly increase exponentially, making the process too time-consuming. Therefore, a branch removal solution further needs to be used in the traversal process of the depth-first search processing, specifically as follows (S20-S30):

S20: Detect a number of recursions of the depth-first search processing.

S21: When the number of recursions does not reach a threshold, performing node determination processing on a current search node.

In some embodiments, the current search node is a plot node that the depth-first search processing reaches at a current moment, and a starting position of the depth-first search processing is a target exit node of the target determination node.

In some embodiments, the node determination processing includes: detecting whether the current search node is the target node or whether the current search node is on the historical plot path; if yes (i.e., when the current search node is the target node or is on the historical plot path), determining that the current search node passes the node determination processing; otherwise, determining that the current search node does not pass the node determination processing.

S22: When the current search node fails the node determination processing, use a next exit node of the current search node as the current search node, increment the number of recursions, and perform the operation S20 of detecting a number of recursions of the depth-first search processing.

S23: When the current search node passes the node determination processing, perform plot logic verification on the current search node.

In some embodiments, the plot logic verification includes: performing path splicing on the first plot path and a historical path after the current search node on the historical plot path to generate a temporary spliced path; and when the temporary spliced path conforms to the plot logic rule, determining that the current search node passes the plot logic verification; otherwise, determining that the current search node does not pass the plot logic verification.

S24: When the current search node passes the plot logic verification, determine the current search node as the plot splicing node.

S25: When the current search node fails the plot logic verification, use a next exit node of the current search node as the current search node, increment the number of recursions, and perform the operation S20 of detecting a number of recursions of the depth-first search processing.

S26: When the number of recursions reaches the threshold, detect whether none of exit nodes of the current search node is on the historical plot path that reaches the target node.

S27: When none of the exit nodes of the current search node is on the historical plot path, remove a recursive branch where the current search node is located.

S28: When the exit nodes of the current search node include a target exit node on the historical plot path, perform the plot logic verification on the target exit node.

S29: When the target exit node passes the plot logic verification, using the target exit node as the plot splicing node.

S30: When the target exit node fails the plot logic verification, removing the recursive branch where the current search node is located.

In some embodiments, before the above-mentioned branch removal operation is executed, plot nodes that are on the historical path among exit nodes of the target determination node to obtain remaining read plot nodes may be removed. Then, depth-first search processing is performed in the remaining read plot nodes to obtain the plot splicing node that conforms to the plot logic rule.

The above process may be simply understood as that: if the current node in the traversal process is on the historical path, the historical path after the node and the current path being traversed are spliced into a new path. If the new path is reachable (that is, the new path is logically reachable), it is determined that the requirement is met, and the process ends. If the new path is unreachable (that is, the new path is logically unreachable), DFS recursive search is performed starting from this node. To avoid an excessively deep recursion, an upper limit may be set. When the recursion depth reaches the upper limit, it is determined whether all exit nodes of the node are on the historical path of the target node. If not, the process returns directly to finding nodes of other branches, to avoid the time-consuming recursion that follows. The upper limit may be set by related technical personnel, which is not particularly limited in the embodiments of this application. Although it is possible to find a path to the target node by continuing the recursive search, the objective of this solution is to quickly find an available path, and the historical path can be fully utilized in this case, which can quickly avoid unnecessary recursive branches, thereby greatly reducing time and space overheads.

Step S2: Generate the spliced plot path based on the plot splicing node.

In some embodiments, the above step S2 may be implemented in at least two manners, as follows:

Method 1: Perform path splicing on the first plot path and a historical path after the plot splicing node on the historical plot path to generate the spliced plot path.

Method 2: Use the temporary spliced path that conforms to the plot logic rule as the spliced plot path.

The above solution for the scenario 1 can be summarized as: updating the value of the target node according to the latest value of the current node. Taking an interactive game scenario as an example, the process may be simply understood as follows. First, a last intersection node of the current path of the player and the historical path of the target node is found. A first segment of the new path is the current path before the intersection node, a second segment of the new path is the historical path after the intersection node, and the two path segments are spliced into a new path to the target node. If the new path is logically reachable, the new path is used. If the new path is logically unreachable, a logically unreachable determination node is found, and a depth-first search (DFS) with a limit on the number of recursions is performed in the nodes that are not on the historical path after the determination node (because nodes on the historical path are already unreachable), until the target node is found.

Figure 4:
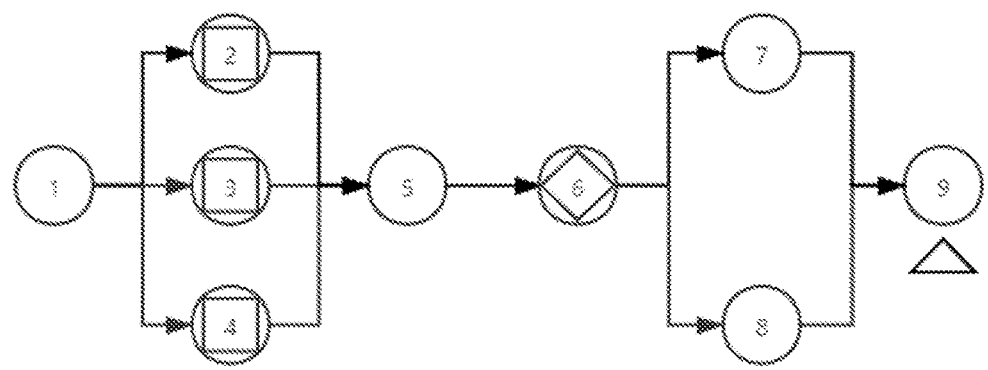
FIG. 4 is a schematic diagram of a plot structure according to another embodiment of this application.

In an example, as shown in FIG. 4, the player's latest historical path to node 9 is [1, 2, 5, 6, 7, 9]. When the player goes back to the node 1 to change the choice made at node 1 to node 4, the latest path to node 5 becomes [1, 4, 5]. In this case, a traversal is performed starting from node 5 to node 9, the nodes that have been passed after the current node are searched to sequentially find a set of nodes that are logically reachable and can reach the target node as the latest path. The search operation is performed using a depth-first search (DFS) algorithm. Based on the value at node 5, node 6 is found by depth-first search, the current node is changed to node 6, and it is determined by verification that node 6 is logically reachable. Node 6 is added into the current path. Exit nodes 7 and 8 of node 6 are found. When the current node is changed to node 7, it is determined by verification that node 7 is logically unreachable. When the current node is changed to node 8, it is determined by verification that node 8 is logically reachable. The operations are repeatedly performed until the target node is found. If there is another node having not been gone through after node 6, this node will be excluded from the traversal range.

The technical solution adopted for the second scenario is described below.

Scenario 2: There is no superior-subordinate relationship between the current node and the target node.

When the superior-subordinate relationship does not exist between the current node and the target node, based on a target plot parameter that causes the default spliced plot path to not conform to the plot logic rule, a plot node involving a change of the target plot parameter in the default spliced plot path is changed to obtain the spliced plot path that conforms to the plot logic rule.

The change of the target plot parameter change is used for satisfying the plot logic rule. Plot parameters in the spliced plot path other than the target plot parameter satisfy the plot parameter condition.

In one embodiment, the above solution may be implemented by the following steps (A1-A8):

A1: Mark the target plot parameter.

A2: Obtain all intersection nodes of the first plot path and the historical plot path.

A3: Perform parameter modification checking processing on a path interval between every two adjacent intersection nodes on the first plot path.

In some embodiments, the parameter modification checking processing is used for checking whether a plot node in the path interval involves a value change operation performed on the marked target plot parameter.

A4: When no plot node in the path interval involves the value change operation performed on the target plot parameter, the first plot path is used in the target path interval to obtain an adjusted first plot path.

A5: When a plot node in the path interval involves the value change operation performed on the target plot parameter, the historical plot path is used in the target path interval to obtain an adjusted first plot path.

A6: Splice the adjusted first plot path with the historical plot path after a last intersection node to obtain a replacing spliced path.

A7: When the replacing spliced path conforms to the plot logic rule, determining the replacing spliced path as the spliced plot path, and stopping performing the parameter modification checking processing on a next path interval.

A8: When the replacing spliced path does not conform to the plot logic rule, performing the parameter modification checking processing on the next path interval (for the next path interval, return to step A3 to repeat the process).

For the case where the current node and the target node do not have a superior-subordinate relationship, that is, a path from the current node to the target node cannot be found, it is also desirable to update the value of the target node based on the latest value of the current node. This obviously cannot guarantee that all values are up-to-date, because if all values are up-to-date, then the determination node will inevitably point to the path of the current node, and the target node is not logically reachable. In view of this, all values except the value of the determination node are kept up-to-date, and the value of the determination node is kept up-to-date to such an extent that the path of the determination node to the target node is logically reachable.

The idea of the solution is as follows. First, a default spliced path is generated. If the default spliced path is logically reachable, the default spliced path is used directly. If the default spliced path is logically unreachable, a determination node that causes the default spliced path to be logically unreachable is found, and a target parameter that causes the default spliced path to be logically unreachable is marked. A modification is made based on the current path. A path after the determination node is changed to a historical path. All intersections of the current path and the historical path are found. From back to front, if a value change operation on the target parameter is involved between every two intersection nodes, the corresponding historical path is used between the two intersection nodes. If the value change operation on the target parameter is not involved between the two intersection nodes, the latest path is used. In some embodiments, every time a historical path is used in a path interval, the new path after the modification is checked to determine whether the target node can be reached. The purpose of this is to change the latest values as little as possible. In this way, from back to front, the paths between the intersection nodes are spliced segment by segment to meet the expected requirements.

Figure 5:
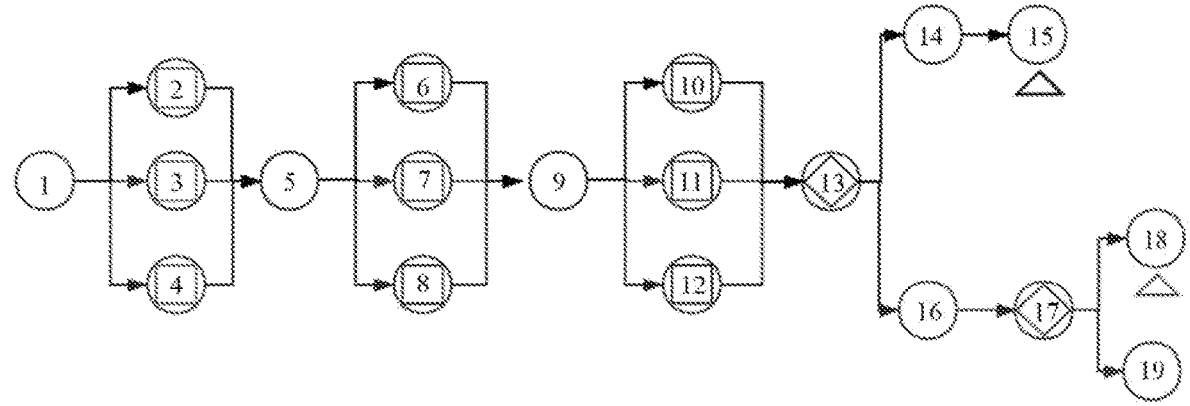
FIG. 5 is a schematic diagram of a plot structure according to another embodiment of this application.

In an example, as shown in FIG. 5, for a target node 18, a latest historical path to the target node 18 is [1, 4, 5, 8, 9, 12, 13, 16, 17, 18]. A current path to the current node 14 is [1, 2, 5, 6, 9, 10, 13, 14, 15]. In this case, from the current node 14 to the target node 18, the last intersection node of the historical path and the current path is a determination node 13. The determination node 13 is a value determination node containing a parameter B. In order to ensure that the spliced path can reach the target node 18, the value of the parameter B needs to satisfy a value determination condition for jumping from the determination node 13 to an ordinary node 16. Therefore, it can be determined that the expected effect of this path splicing process is: keeping a value of a parameter A unchanged under the condition that the value of the parameter B satisfies the value determination of the determination node 13.

In this example, the idea of applying path splicing in this solution is as follows. All the intersection nodes of the current path and the historical path of the target node are found. Plot nodes in a path interval determined by very two adjacent intersection nodes are detected. The purpose of the detection is to determine whether the nodes in the path interval include a node involving a value change operation on the target parameter B. If a node involving a value change operation on the target parameter B exists in a path interval, a plot node on the historical path is used in this path interval; otherwise, a plot node on the current path is used. In addition, in order to modify the current path selected by the player as little as possible, once it is found that a spliced path generated by changing the selection at a certain node satisfies a logical reachability condition and can lead to the target node, the determination and change between other intersection nodes are stopped.

In this way, the latest path finally obtained is [1, 4, 5, 8, 9, 12, 13, 16, 17, 18]. Nodes 2, 3, and 4 involving a value change operation on the parameter B exist between node 1 and node 5. Therefore, a historical path passing through node 4 is selected as the spliced path in the path interval between node 1 and node 5. Nodes 10, 11, and 12 involving a value change operation on the parameter B exist between node 9 and node 13. Therefore, a historical path passing through node 12 is selected as the spliced path in the path interval between node 9 and node 13. No node involving a value change operation on the parameter B exist between node 5 and node 9, and only nodes 6, 7, and 8 involving a value change operation on the parameter A exist between node 5 and node 9. Therefore, a current path passing through node 6 is selected as the spliced path in the path interval between node 5 and node 9. In this way, the latest value of the parameter A obtained by the user on the current path is not changed, and at the same time, the parameter B also satisfy the value determination condition of pointing to the plot node 16 at the determination node 13. Therefore, the spliced path achieves the expected effect of path splicing.

If the value of the determination node to reach the target node can be satisfied by changing only changing one node involving a change of the value of the parameter B, the new path generated may be [1, 2, 5, 6, 9, 12, 13, 16, 17, 18].

Step 240: Update a plot parameter corresponding to the target node based on the spliced plot path.

In some embodiments, the plot parameter corresponding to the target node is updated based on a parameter change operation and a parameter determination operation in each plot node in the spliced plot path.

In summary, in the technical solutions provided in the embodiments of this application, based on the latest path for reaching the current node and the latest plot parameter and on the premise of ensuring that both the plot logic rule and the plot parameter condition are satisfied, the current path and the historical path are spliced to obtain a spliced plot path that conforms to the plot logic rule and satisfies the plot parameter condition, ensures that a new path after the jumping operation will not cause the problem of unreachable spliced path due to the existence of determination nodes, and that the spliced path satisfies maximum parameter changes, thereby effectively maintaining the latest plot state.

Figure 6:
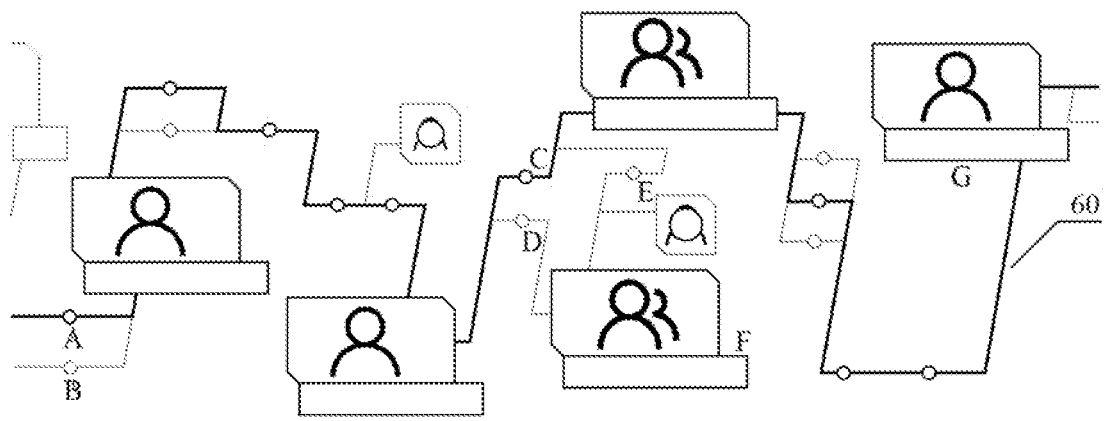
FIG. 6 is a schematic diagram of a plot structure according to another embodiment of this application.
Figure 7:
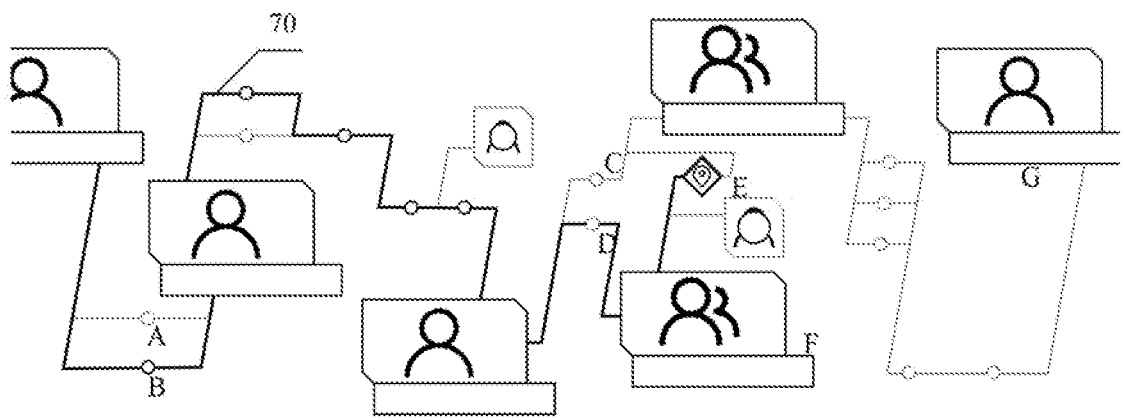
FIG. 7 is a schematic diagram of a plot structure according to another embodiment of this application.
Figure 8:
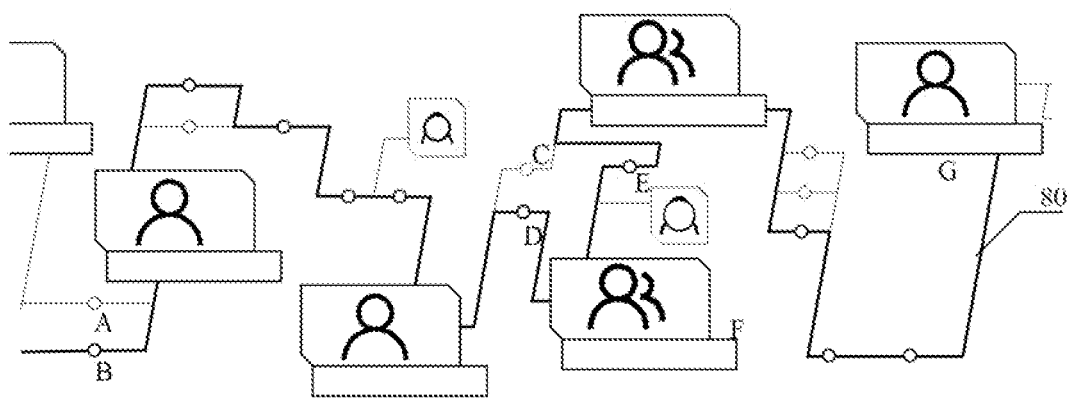
FIG. 8 is a schematic diagram of a plot structure according to another embodiment of this application.

The above beneficial effects are explained below with several examples:

Solutions used in the related art are generally used in the jumping operation to find the last intersection node of the current path of the player and the historical path of the target node. A first segment of the new path is the current path before the intersection node, a second segment of the new path is the historical path after the intersection node, and the two path segments are spliced into a new path to the target node. In one example, refer to FIG. 6, which shows a schematic diagram of a plot structure. A historical path that reaches plot node G is a path 60 denoted by a bold line. For several representative nodes on the path 60, the user needs to select A and C from several bifurcation nodes in order to reach node G. In another example, refer to FIG. 7, which shows a schematic diagram of a plot structure. If the current node is E, and a path to E is a path 70 denoted by a bold line in FIG. 7, the user selects B and D at several representative nodes. With reference to the above two examples, in this example, as shown in FIG. 8, in this case, for jumping from the current node E to G, a path 80 to G is changed as follows: the representative bifurcation nodes change from A and C to B, D, F, and E. If nodes E and F are involved in a value change, then the latest value arriving at node G also changes.

The above solution is applicable to a node jumping operation in a simple plot scenario, but is inapplicable to an application scenario where a node involves a value determination on a historical path of the target node jumped to.

An example is shown in FIG. 4 by way of description. In this example, patterns of nodes 2, 3, and 4 represent nodes involving a value change operation, a pattern of node 6 represents a node involving a value determination operation, and a pattern 3 of node 1 represents an ordinary nodes involving neither a value determination operation nor a value change operation. Nodes 2, 3, and 4 in FIG. 4 change a certain value, and node 6 makes a value determination on the value. For example, if the value is greater than a threshold x, the plot goes to node 7; otherwise, the plot goes to node 8. The specific value of x may be set by related technical personnel, which is not particularly limited in the embodiments of this application. In a possible case, the player reached node 9 following a path [1, 2, 5, 6, 7, 9] last time. If the player goes back to node 1 to change the value to jump to node 9, a spliced path obtained by path splicing performed according to the path splicing solution provided in the related art may not be reachable, because the determination at node 6 may point to node 8, rather than node 7 after splicing. When the path is logically unreachable, a historical path of the target node will still be used, that is, the path is adjusted to [1, 2, 5, 6, 7, 9]. In this case, the value of the plot parameter when the target node 9 is reached is not updated due to the change during the previous backtracking to node 1, failing to provide the expected effect of the user.

The idea provided by the technical solution of this application is to perform path exploration based on the current latest path, which ensures that the new path after the jumping operation will not cause the problem of unreachable spliced path due to the existence of determination nodes. In addition, the application scenarios of this solution are further expanded: before and after the jumping operation, the spliced path satisfies the requirement of changing as few values as possible while keeping other values unchanged.

Figure 9:
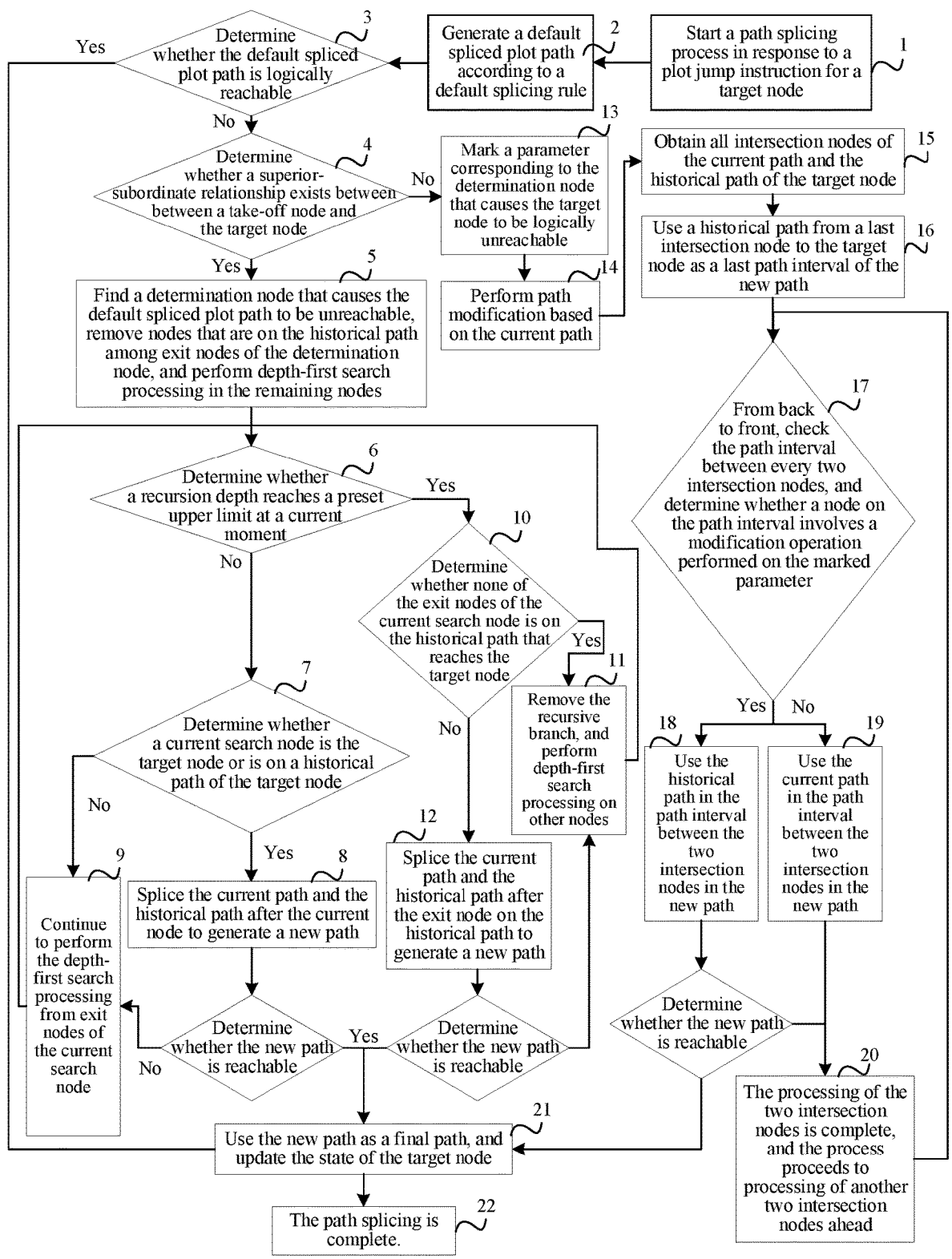
FIG. 9 is a flowchart of a method for interactive plot jumping according to another embodiment of this application.

FIG. 9 is a flowchart of a method for interactive plot jumping according to another embodiment of this application. The method is executed by a computer device. The method may include the following steps (1-22):

Step 1: Start a path splicing process in response to a plot jump operation for a target node.

Step 2: Generate a default spliced plot path according to a default splicing rule.

Step 3: Determine whether the default spliced plot path is logically reachable. If yes, go to step 21; otherwise, go to step 4.

Step 4: Determine whether a superior-subordinate relationship exists between a take-off node and the target node. If yes, go to step 5; otherwise, go to step 13.

Step 5: Find a determination node that causes the default spliced plot path to be unreachable, remove nodes that are on the historical path among exit nodes of the determination node, and perform depth-first search processing in the remaining nodes.

Step 6: Determine whether a recursion depth reaches a preset upper limit at a current moment. If yes, go to step 10; otherwise, go to step 7.

Step 7: Determine whether a current search node is the target node or is on a historical path of the target node. If yes, go to step 8; otherwise, go to step 9.

Step 8: Splice the current path and the historical path after the current node to generate a new path. If the new path is reachable, go to step 21; otherwise, go to step 9.

Step 9: Continue to perform the depth-first search processing from exit nodes of the current search node, and go to step 6.

Step 10: Determine whether none of the exit nodes of the current search node is on the historical path that reaches the target node. If yes, go to step 11; otherwise, go to step 12.

Step 11: Remove the recursive branch, perform depth-first search processing on other nodes, and go to step 6.

Step 12: Splice the current path and the historical path after the exit node on the historical path to generate a new path. If the new path is logically reachable, go to step 21; otherwise, go to step 11.

Step 13: Mark a parameter corresponding to the determination node that causes the target node to be logically unreachable Step 14: Perform path modification based on the current path.

Step 15: Obtain all intersection nodes of the current path and the historical path of the target node.

Step 16: Use a historical path from a last intersection node to the target node as a last path interval of the new path.

Step 17: From back to front, check the path interval between every two intersection nodes, and determine whether a node on the path interval involves a modification operation performed on the marked parameter. If yes, go to step 18; otherwise, go to step 19.

Step 18: Use the historical path in the path interval between the two intersection nodes in the new path, and determine whether the new path can reach the target node. If yes, go to step 21. otherwise, go to step 20.

Step 19: Use the current path in the path interval between the two intersection nodes in the new path.

Step 20. The processing of the two intersection nodes is complete, and the process proceeds to processing of another two intersection nodes ahead. Go to step 17.

Step 21: Use the new path as a final path, and update the state of the target node.

Step 22. The path splicing is complete.

In summary, in the technical solutions provided in the embodiments of this application, based on the latest path for reaching the current node and the latest plot parameter and on the premise of ensuring that both the plot logic rule and the plot parameter condition are satisfied, the current path and the historical path are spliced to obtain a spliced plot path that conforms to the plot logic rule and satisfies the plot parameter condition, ensures that a new path after the jumping operation will not cause the problem of unreachable spliced path due to the existence of determination nodes, and that the spliced path satisfies maximum parameter changes, thereby effectively maintaining the latest plot state.

In addition, the method provided in this application provides greater flexibility for the plot design of interactive films, providing technical support for more complex plot logic, and broadening the scope of application.

Figure 10:
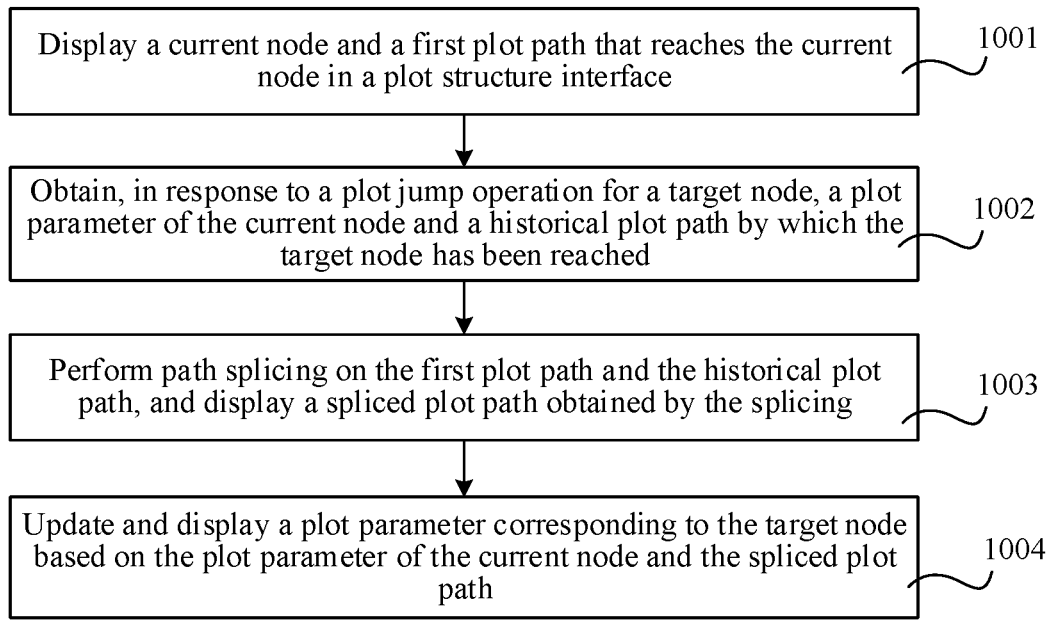
FIG. 10 is a flowchart of a method for displaying an interactive plot interface according to an embodiment of this application.

FIG. 10 is a flowchart of a method for displaying an interactive plot interface according to an embodiment of this application. The method is executed by a computer device. The method may include the following steps (1001-1004):

Step 1001: Display a current node and a first plot path that reaches the current node in a plot structure interface.

In some embodiments, the current node is used for indicating a plot where a user is currently located.

Game plot structure interface: It is used for presenting an entire game plot structure to the player. Through the game plot structure interface, the player can understand a game plot experienced by the player, a game plot course of the player, an association between game plots, and the like. For example, the game scenario structure interface may be a game storyline interface. In an embodiment of the present application, the game plot structure interface may include plot nodes that the player has entered and for which data has been stored, so that the player can choose to go back into the plot of a historical plot node.

Step 1002: Obtain, in response to a plot jump operation for a target node, a plot parameter of the current node and a historical plot path by which the target node has been reached.

In some embodiments, the plot jump operation is used for instructing a plot to jump from the current node to the target node. In some embodiments, a plot jump instruction is generated according to the received plot jump operation, and the plot parameter of the current node and the historical plot path that has reached the target node are obtained based on the current jump instruction.

Step 1003: Perform path splicing on the first plot path and the historical plot path, and display a spliced plot path obtained by splicing.

In some embodiments, the path splicing may be performed by a client, or by a server, or by the client and the server that interact with each other, which is not particularly limited in the embodiments of this application.

In some embodiments, after the user returns to the game plot structure interface from the plot screen, the spliced plot path obtained by splicing is displayed.

In some embodiments, after the user clicks on the target node, the spliced plot path obtained by splicing is displayed.

In some embodiments, after the user clicks on the target node, a plot screen display control corresponding to the target node is displayed, and at the same time, the spliced plot path obtained by splicing is displayed.

The path splicing is used for splicing the first plot path with the historical plot path when the plot parameter of the current node satisfies a plot parameter condition, to obtain the spliced plot path leading to the target node and conforming to a plot logic rule.

Step 1004: Update and display a plot parameter corresponding to the target node based on the plot parameter of the current node and the spliced plot path.

In some embodiments, the updated plot parameter corresponding to the target node is displayed in the plot structure interface.

This embodiment is an embodiment of the above-mentioned method for interactive plot jumping on the product side. For the explanation of related terms involved, reference may be made to the explanation of the related terms in the above embodiments. For example, in narrative products, the value is changed at some nodes, and when different nodes are selected, the value is changed differently. The value may vary with different paths to the same node. When the determination node of the value is reached, different values lead to different nodes, causing the player to see different plot contents. The player may jump back and forth on several nodes of the storyline and make choices to change the values, and does not need to repeatedly watch node videos that have been watched, to quickly experience the new plot.

In summary, in the technical solutions provided in the embodiments of this application, based on the latest path for reaching the current node and the latest plot parameter and on the premise of ensuring that both the plot logic rule and the plot parameter condition are satisfied, the current path and the historical path are spliced to obtain a spliced plot path that conforms to the plot logic rule and satisfies the plot parameter condition, ensures that a new path after the jumping operation will not cause the problem of unreachable spliced path due to the existence of determination nodes, and that the spliced path satisfies maximum parameter changes, thereby effectively maintaining the latest plot state.

The following is an apparatus embodiment of this application, which can be used to execute the method embodiments of this application. For details that are not disclosed in the apparatus embodiments of this application, refer to the method embodiments of this application.

Figure 11:
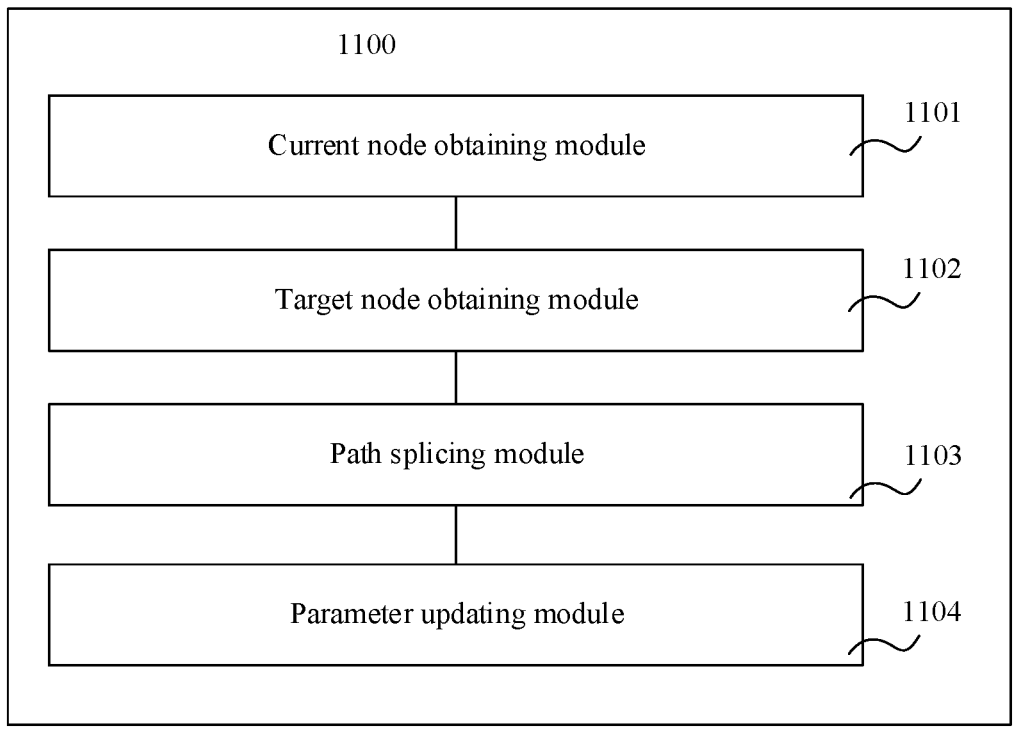
FIG. 11 is a block diagram of an apparatus for interactive plot jumping according to an embodiment of this application.

FIG. 11 is a block diagram of an apparatus for interactive plot jumping according to an embodiment of this application. The apparatus has a function of implementing the above-mentioned method for interactive plot jumping. The apparatus 1100 may include: a current node obtaining module 1101, a target node obtaining module 1102, a path splicing module 1103, and a parameter updating module 1104.

The current node obtaining module 1101 is configured to obtain current node information, the current node information including a first plot path that reaches a current node and a plot parameter of the current node, the current node being used for indicating a plot where a user is currently located, and the plot parameter being used for reflecting a user status of the user at the current node.

The target node obtaining module 1102 is configured to obtain target node information in response to a plot jump instruction for a target node, the target node information including a plot parameter of the target node and a historical plot path by which the target node has been reached, and the plot jump instruction being used for instructing a plot to jump from the current node to the target node.

The path splicing module 1103 is configured to perform path splicing on the first plot path and the historical plot path to obtain a spliced plot path that conforms to a plot logic rule and satisfies a plot parameter condition, the spliced plot path leading to the target node.

The parameter updating module 1104 is configured to update the plot parameter corresponding to the target node based on the spliced plot path.

In one embodiment, the path splicing module 1103 is configured to perform operations of:
 performing the path splicing on the first plot path and the historical plot path according to a default splicing rule to obtain a default spliced plot path;
 when the default spliced plot path conforms with the plot logic rule, using the default spliced plot path as the spliced plot path; and
 when the default spliced plot path does not conform to the plot logic rule, performing the path splicing on the first plot path and the historical plot path based on a superior-subordinate relationship between the current node and the target node, to obtain the spliced plot path that conforms to the plot logic rule and satisfies the plot parameter condition.

In one embodiment, the path splicing module 1103 is configured to perform operations of:
 determining whether a superior-subordinate relationship exists between the current node and the target node;
 when the superior-subordinate relationship exists between the current node and the target node, performing depth-first search processing in plot nodes before the target node to obtain plot splicing nodes that conform to the plot logic rule, wherein plot nodes after the current node do not change the plot parameter of the current node; and generating the spliced plot path based on the plot splicing node;
 when the superior-subordinate relationship does not exist between the current node and the target node, changing, based on a target plot parameter that causes the default spliced plot path to not conform to the plot logic rule, a plot node involving a change of the target plot parameter in the default spliced plot path to obtain the spliced plot path that conforms to the plot logic rule, wherein plot parameters in the spliced plot path other than the target plot parameter satisfy the plot parameter condition.

In one embodiment, the path splicing module 1103 is further configured to perform operations of:
 obtaining read plot nodes after a target determination node, the target determination node being a plot node that causes the default spliced plot path to not conform to the plot logic rule and involves a determination of the target plot parameter, and the read plot node being plot nodes that has been reached; and
 the performing depth-first search processing in plot nodes before the target node to obtain plot splicing nodes that conform to the plot logic rule includes:
 performing the depth-first search processing in the read plot nodes after the target determination node to obtain the plot splicing node that conforms to the plot logic rule.

In one embodiment, the path splicing module 1103 is configured to perform operations of:
 removing plot nodes that are on the historical path among exit nodes of the target determination node to obtain remaining read plot nodes; and
 performing the depth-first search processing in the remaining read plot nodes to obtain the plot splicing node that conforms to the plot logic rule.

In one embodiment, the path splicing module 1103 is further configured to perform operations of:

detecting a number of recursions of the depth-first search processing;

when the number of recursions does not reach a threshold, performing node determination processing on a current search node, the current search node being a plot node that the depth-first search processing reaches at a current moment, and a starting position of the depth-first search processing being a target exit node of the target determination node; when the current search node fails the node determination processing, using a next exit node of the current search node as the current search node, incrementing the number of recursions, and performing the operation of detecting a number of recursions of the depth-first search processing; when the current search node passes the node determination processing, performing plot logic verification on the current search node; when the current search node passes the plot logic verification, determining the current search node as the plot splicing node; when the current search node fails the plot logic verification, using a next exit node of the current search node as the current search node, incrementing the number of recursions, and performing the operation of detecting a number of recursions of the depth-first search processing;

when the number of recursions reaches the threshold, detecting whether none of exit nodes of the current search node is on the historical plot path that reaches the target node; when none of the exit nodes of the current search node is on the historical plot path, removing a recursive branch where the current search node is located; when the exit nodes of the current search node include a target exit node on the historical plot path, performing the plot logic verification on the target exit node; when the target exit node passes the plot logic verification, using the target exit node as the plot splicing node; when the target exit node fails the plot logic verification, removing the recursive branch where the current search node is located.

In one embodiment, the path splicing module 1103 is configured to perform operations of:

detecting whether the current search node is the target node or whether the current search node is on the historical plot path; when the current search node is the target node or is on the historical plot path, determining that the current search node passes the node determination processing; otherwise, determining that the current search node does not pass the node determination processing; and the performing plot logic verification on the current search node includes:

performing path splicing on the first plot path and a historical path after the current search node on the historical plot path to generate a temporary spliced path; and when the temporary spliced path conforms to the plot logic rule, determining that the current search node passes the plot logic verification; otherwise, determining that the current search node does not pass the plot logic verification.

In one embodiment, the path splicing module 1103 is configured to perform operations of:

performing path splicing on the first plot path and a historical path after the plot splicing node on the historical plot path to generate the spliced plot path; or using the temporary spliced path that conforms to the plot logic rule as the spliced plot path.

In one embodiment, the path splicing module 1103 is further configured to perform operations of:

marking the target plot parameter;

obtaining all intersection nodes of the first plot path and the historical plot path;

performing parameter modification checking processing on a path interval between every two adjacent intersection nodes on the first plot path, the parameter modification checking processing being used for checking whether a plot node in the path interval involves a value change operation performed on the marked target plot parameter;

when no plot node in the path interval involves the value change operation performed on the target plot parameter, using, in the target path interval, a path formed between adjacent intersection nodes on the first plot path that correspond to the target path interval;

when a plot node in the path interval involves the value change operation performed on the target plot parameter, using, in the target path interval, a path formed between adjacent intersection nodes on the historical plot path that correspond to the target path interval, to obtain an adjusted first plot path;

splicing the adjusted first plot path with the historical plot path after a last intersection node to obtain a replacing spliced path;

when the replacing spliced path conforms to the plot logic rule, determining the replacing spliced path as the spliced plot path, and stopping performing the parameter modification checking processing on a next path interval; and when the replacing spliced path does not conform to the plot logic rule, performing the parameter modification checking processing on the next path interval.

In one embodiment, the path splicing module 1103 is further configured to perform operations of:

determining a target determination node in intersection nodes of the first plot path and the historical plot path, the target determination node being a node that causes the default spliced plot path to not conform to the plot logic rule and involves a plot parameter determination.

In summary, in the technical solutions provided in the embodiments of this application, based on the latest path for reaching the current node and the latest plot parameter and on the premise of ensuring that both the plot logic rule and the plot parameter condition are satisfied, the current path and the historical path are spliced to obtain a spliced plot path that conforms to the plot logic rule and satisfies the plot parameter condition, ensures that a new path after the jumping operation will not cause the problem of unreachable spliced path due to the existence of determination nodes, and that the spliced path satisfies maximum parameter changes, thereby effectively maintaining the latest plot state.

Figure 12:
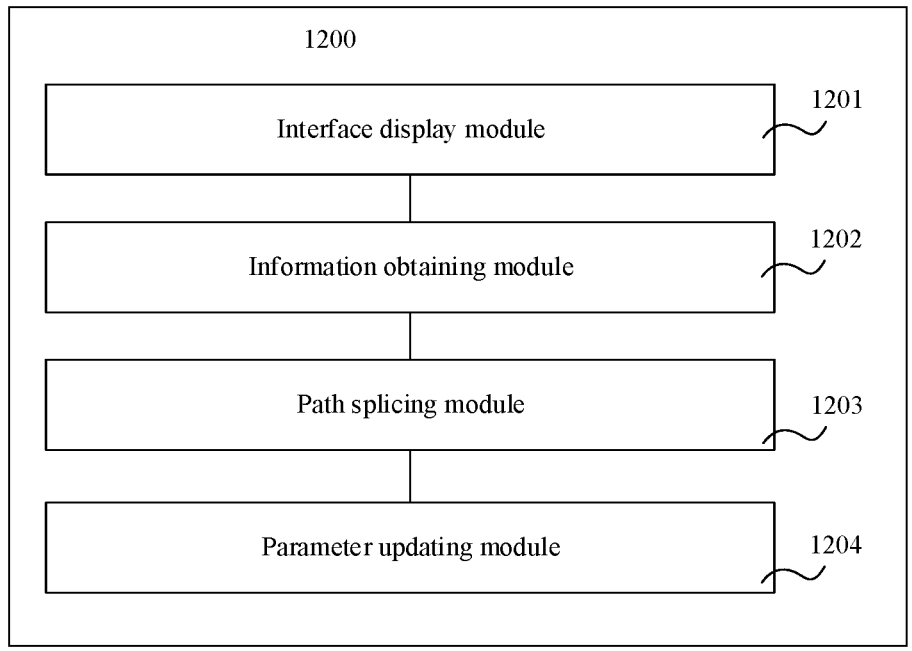
FIG. 12 is a block diagram of an apparatus for displaying an interactive plot interface according to an embodiment of this application.

FIG. 12 is a block diagram of an apparatus for displaying an interactive plot interface according to another embodiment of this application. The apparatus has a function of implementing the above-mentioned method for displaying an interactive plot interface. The apparatus 1200 may include: an interface display module 1201, an information obtaining module 1202, a path splicing module 1203, and a parameter updating module 1204.

The interface display module 1201 is configured to display a current node and a first plot path that reaches the current node in a plot structure interface, the current node being used for indicating a plot where a user is currently located.

The information obtaining module 1202 is configured to obtain, in response to a plot jump operation for a target node, a plot parameter of the current node and a historical plot path by which the target node has been reached, the plot jump operation being used for instructing a plot to jump from the current node to the target node.

The path splicing module 1203 is configured to perform path splicing on the first plot path and the historical plot path, and display a spliced plot path obtained by the splicing, the path splicing being used for splicing the first plot path with the historical plot path when the plot parameter of the current node satisfies a plot parameter condition, to obtain the spliced plot path leading to the target node and conforming to a plot logic rule.

The parameter updating module 1204 is configured to update and display a plot parameter corresponding to the target node based on the plot parameter of the current node and the spliced plot path.

In summary, in the technical solutions provided in the embodiments of this application, based on the latest path for reaching the current node and the latest plot parameter and on the premise of ensuring that both the plot logic rule and the plot parameter condition are satisfied, the current path and the historical path are spliced to obtain a spliced plot path that conforms to the plot logic rule and satisfies the plot parameter condition, ensures that a new path after the jumping operation will not cause the problem of unreachable spliced path due to the existence of determination nodes, and that the spliced path satisfies maximum parameter changes, thereby effectively maintaining the latest plot state.

Figure 13:
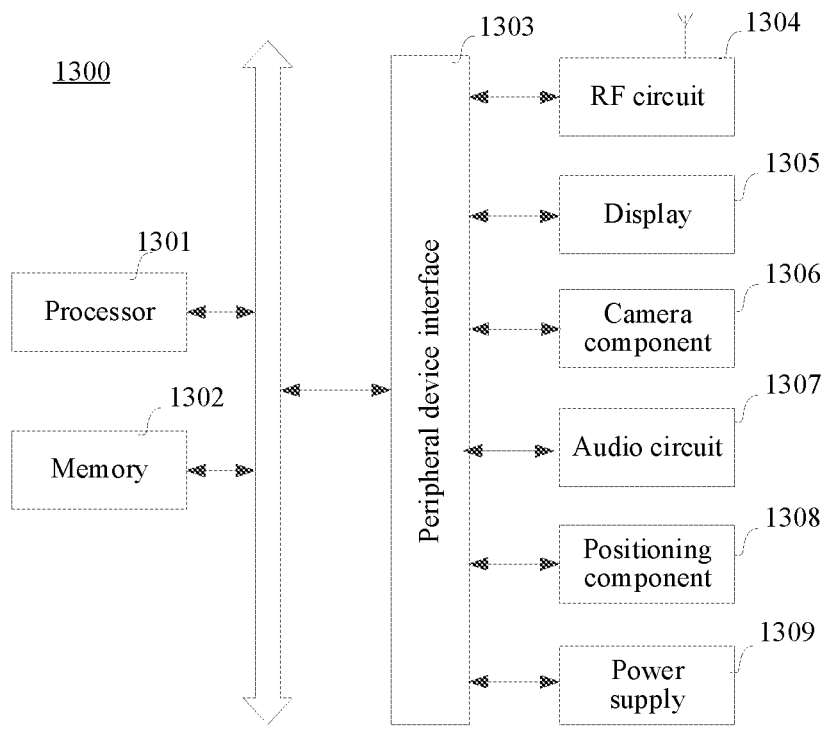
FIG. 13 is a structural block diagram of a computer device according to an embodiment of this application.

FIG. 13 is a schematic block diagram of a computer device 1100 according to an embodiment of this application. The computer device 1300 may be an electronic device such as a mobile phone, a tablet computer, a game console, a multimedia playback device, a wearable device, a personal computer (PC), a handheld portable gaming device, and the like. The computer device is configured to implement the method provided in the foregoing embodiments. The computer device may be the terminal 10 or the server 20 in the application running environment shown in FIG. 1. To be specific, generally, the computer device 1300 includes a processor 1301 and a memory 1302.

The processor 1301 may include one or more processing cores, and may be, for example, a 4-core processor or an 8-core processor. The processor 1301 may be implemented by using at least one hardware form of a digital signal processor (DSP), a field-programmable gate array (FPGA), or a programmable logic array (PLA). The processor 1301 may also include a main processor and a coprocessor. The main processor is a processor configured to process data in an awake state, and is also referred to as a central processing unit (CPU). The coprocessor is a low power consumption processor configured to process data in a standby state. In some embodiments, a graphics processing unit (GPU) may be integrated into the processor 1301. The GPU is configured to be responsible for rendering and drawing content to be displayed on a display. In some embodiments, the processor 1301 may further include an artificial intelligence (AI) processor. The AI processor is configured to process a calculation operation related to machine learning.

The memory 1302 may include one or more computer-readable storage media that may be non-transitory. The memory 1302 may further include a high-speed random access memory and a non-transitory memory, for example, one or more magnetic disk storage devices or flash storage devices. In some embodiments, the non-transitory computer-readable storage medium in the memory 1302 is configured to store at least one instruction, at least one program, a code set, or an instruction set. The at least one instruction, the at least one program, the code set, or the instruction set is configured to be executed by one or more processors to implement the above method.

In some embodiments, the computer device 1300 further in some embodiments includes a peripheral device interface 1303 and at least one peripheral device. The processor 1301, the memory 1302, and the peripheral device interface 1303 may be connected by using a bus or a signal cable. Each peripheral device may be connected to the peripheral device interface 1303 through a bus, a signal cable, or a circuit board. Specifically, the peripheral device includes: at least one of a radio frequency (RF) circuit 1304, a touch display screen 1305, a camera component 1306, an audio circuit 1307, a positioning component 1308, and a power supply 1309.

A person skilled in the art may understand that the structure shown in FIG. 13 does not constitute a limitation to the computer device 1300, and the terminal may include more or fewer components than those shown in the figure, or some components may be combined, or a different component arrangement may be used.

In one embodiment, a computer-readable storage medium is further provided. The computer-readable storage medium stores at least one instruction, at least one program, a code set, or an instruction set, the at least one instruction, the at least one program, the code set, or the instruction set being executed by a processor to implement the above-mentioned method for interactive plot jumping.

In one embodiment, a computer-readable storage medium is further provided. The computer-readable storage medium stores at least one instruction, at least one program, a code set, or an instruction set, the at least one instruction, the at least one program, the code set, or the instruction set being executed by a processor to implement the above-mentioned method for displaying an interactive plot interface.

In some embodiments, the computer-readable storage medium may include: a read only memory (ROM), a random access memory (RAM), a solid state hard disk (SSD), an optical disc, and the like. The random access memory may include a resistive random access memory (ReRAM) and a dynamic random access memory (DRAM).

In one embodiment, a computer program product or a computer program is provided. The computer program product or the computer program includes computer instructions, and the computer instructions are stored in a computer-readable storage medium. A processor of a computer device reads the computer instructions from the computer-readable storage medium and executes the computer instructions to cause the computer device to perform the method for interactive plot jumping described above.

In one embodiment, a computer program product or a computer program is provided. The computer program product or the computer program includes computer instructions, and the computer instructions are stored in a computer-readable storage medium. A processor of a computer device reads the computer instructions from the computer-readable storage medium and executes the computer instructions to cause the computer device to perform the method for displaying an interactive plot interface described above.

"A plurality of" mentioned in the specification means two or more. "And/or" describes an association relationship for associated objects and represents that three relationships may exist. For example, A and/or B may represent the following three cases: only A exists, both A and B exist, and only B exists. The character "/" generally indicates an "or" relationship between the associated objects. In addition, the step numbers described in this specification merely show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for interactive plot jumping, executed by a computer device, the method comprising:
    displaying, in a graphical plot structure interface of a game application and based on a game play progress of a user, a plurality of nodes and paths indicating multiple branches of a game plot of the game application;
    obtaining current node information comprising a first plot path that starts from a root node and reaches a current node and a plot parameter of the current node, the current node indicating a plot where the user is currently located, and the plot parameter reflecting a user gaming status of the user at the current node;
    obtaining target node information in response to a plot jump instruction for a target node received on the graphical plot structure interface, the target node information comprising a plot parameter of the target node and a historical plot path by which the target node has been reached from the root node, the historical plot path and the first plot path having one or more intersection nodes, and the plot jump instruction instructing a plot to jump from the current node to the target node;
    performing path splicing on the first plot path and the historical plot path according to a default splicing rule to obtain a default spliced plot path, wherein the default spliced plot path is formed by a current path and a partial historical plot path, the current path starts from the root node and follows the first plot path to reach a first intersection node of the one or more intersection nodes, and the partial historical plot path starts from the first intersection node and follows the historical plot path to reach the target node;
    in response to that the default spliced plot path conforms to a plot logic rule and satisfies a plot parameter condition, using the default spliced plot path as a target spliced plot path;
    in response to that the default spliced plot path does not conform to the plot logic rule, identifying a determination node that causes the default spliced plot path to be logically unreachable, and performing path splicing on the first plot path and the historical plot path based on the determination node and a superior-subordinate relationship between the current node and the target node, to obtain the target spliced plot path that conforms to the plot logic rule and satisfies the plot parameter condition;
    updating the plot parameter corresponding to the target node based on the spliced plot path; and
    displaying the target spliced plot path on the graphical plot structure interface.

2. The method according to claim 1, wherein the performing the path splicing on the first plot path and the historical plot path based on a superior-subordinate relationship between the current node and the target node, to obtain the spliced plot path that conforms to the plot logic rule and satisfies the plot parameter condition comprises:
    when the superior-subordinate relationship exists between the current node and the target node, performing depth-first search processing in plot nodes before the target node to obtain a plot splicing node that conforms to the plot logic rule, wherein plot nodes after the current node do not change the plot parameter of the current node; and generating the spliced plot path based on the plot splicing node;
    when the superior-subordinate relationship does not exist between the current node and the target node, changing, based on a target plot parameter that causes the default spliced plot path to not conform to the plot logic rule, a plot node involving a change of the target plot parameter in the default spliced plot path to obtain the spliced plot path that conforms to the plot logic rule, wherein plot parameters in the spliced plot path other than the target plot parameter satisfy the plot parameter condition.

3. The method according to claim 2, wherein before the performing depth-first search processing in plot nodes before the target node to obtain a plot splicing node that conforms to the plot logic rule, the method further comprises:
    obtaining read plot nodes after a target determination node, the target determination node being a plot node that causes the default spliced plot path to not conform to the plot logic rule and involving a determination of the target plot parameter, and the read plot nodes being plot nodes that have been reached; and
    the performing depth-first search processing in plot nodes before the target node to obtain plot splicing nodes that conform to the plot logic rule comprises:
    performing the depth-first search processing in the read plot nodes after the target determination node to obtain the plot splicing node that conforms to the plot logic rule.

4. The method according to claim 3, wherein the performing the depth-first search processing in the read plot nodes after the target determination node to obtain the plot splicing node that conforms to the plot logic rule comprises:
    removing plot nodes that are on the historical path among exit nodes of the target determination node to obtain remaining read plot nodes; and
    performing the depth-first search processing in the remaining read plot nodes to obtain the plot splicing node that conforms to the plot logic rule.

5. The method according to claim 3, wherein the performing the depth-first search processing in the read plot nodes after the target determination node to obtain the plot splicing node that conforms to the plot logic rule comprises:
    detecting a number of recursions of the depth-first search processing;
    when the number of recursions is fewer than a threshold, performing node determination processing on a current search node, the current search node being a plot node that the depth-first search processing reaches at a current moment, and a starting position of the depth-first search processing being a target exit node of the target determination node;

when the current search node fails the node determination processing, using a next exit node of the current search node as the current search node, incrementing the number of recursions, and performing the operation of detecting a number of recursions of the depth-first search processing;

when the current search node passes the node determination processing, performing plot logic verification on the current search node; when the current search node passes the plot logic verification, determining the current search node as the plot splicing node;

when the current search node fails the plot logic verification, using a next exit node of the current search node as the current search node, incrementing the number of recursions, and performing the operation of detecting a number of recursions of the depth-first search processing;

when the number of recursions reaches the threshold, detecting whether any of exit nodes of the current search node is on the historical plot path that reaches the target node;

when none of the exit nodes of the current search node is on the historical plot path, removing a recursive branch where the current search node is located;

when the exit nodes of the current search node comprise a target exit node on the historical plot path, performing the plot logic verification on the target exit node;

when the target exit node passes the plot logic verification, using the target exit node as the plot splicing node;

when the target exit node fails the plot logic verification, removing the recursive branch where the current search node is located.

6. The method according to claim 5, wherein the performing node determination processing on a current search node comprises:

when the current search node is the target node or is on the historical plot path, determining that the current search node passes the node determination processing; otherwise, determining that the current search node does not pass the node determination processing; and the performing plot logic verification on the current search node comprises:

performing path splicing on the first plot path and a historical path after the current search node to generate a temporary spliced path; and when the temporary spliced path conforms to the plot logic rule, determining that the current search node passes the plot logic verification;

otherwise, determining that the current search node does not pass the plot logic verification.

7. The method according to claim 3, wherein the generating the spliced plot path based on the plot splicing node comprises:

performing path splicing on the first plot path and a historical path after the plot splicing node on the historical plot path to generate the spliced plot path; or using the temporary spliced path that conforms to the plot logic rule as the spliced plot path.

8. The method according to claim 2, wherein the changing, based on a target plot parameter that causes the default spliced plot path to not conform to the plot logic rule, a plot node involving a change of the target plot parameter in the default spliced plot path to obtain the spliced plot path that conforms to the plot logic rule comprises:

marking the target plot parameter;

obtaining all intersection nodes of the first plot path and the historical plot path;

checking a parameter modification on a path interval between every two adjacent intersection nodes on the first plot path by checking whether a plot node in the path interval is associated with a value change operation performed on the marked target plot parameter;

when no plot node in the path interval is associated with the value change operation performed on the target plot parameter, using, in the target path interval, a path formed between adjacent intersection nodes on the first plot path that correspond to the target path interval;

when a plot node in the path interval is associated with the value change operation performed on the target plot parameter, using, in the target path interval, a path formed between adjacent intersection nodes on the historical plot path that correspond to the target path interval, to obtain an adjusted first plot path;

splicing the adjusted first plot path with the historical plot path after a last intersection node to obtain a replacing spliced path;

when the replacing spliced path conforms to the plot logic rule, determining the replacing spliced path as the spliced plot path, and stopping checking the parameter modification on a next path interval; and when the replacing spliced path does not conform to the plot logic rule, checking the parameter modification on the next path interval.

9. The method according to claim 2, wherein determination node is associated with a plot parameter determination.

10. A non-transitory computer-readable storage medium, storing at least one instruction, at least one program, a code set, or an instruction set, the at least one instruction, the at least one program, the code set, or the instruction set being loaded and executed by a processor to implement:

displaying, in a graphical plot structure interface of a game application and based on a game play progress of a user, a plurality of nodes and paths indicating multiple branches of a game plot of the game application;

obtaining current node information comprising a first plot path that starts from a root node and reaches a current node and a plot parameter of the current node, the current node indicating a plot where the user is currently located, and the plot parameter reflecting a user gaming status of the user at the current node;

obtaining target node information in response to a plot jump instruction for a target node received on the graphical plot structure interface, the target node information comprising a plot parameter of the target node and a historical plot path by which the target node has been reached from the root node, the historical plot path and the first plot path having one or more intersection nodes, and the plot jump instruction instructing a plot to jump from the current node to the target node;

performing path splicing on the first plot path and the historical plot path according to a default splicing rule to obtain a default spliced plot path, wherein the default spliced plot path is formed by a current path and a partial historical plot path, the current path starts from the root node and follows the first plot path to reach a first intersection node of the one or more intersection nodes, and the partial historical plot path starts from the first intersection node and follows the historical plot path to reach the target node;

in response to that the default spliced plot path conforms to a plot logic rule and satisfies a plot parameter condition, using the default spliced plot path as a target spliced plot path;

in response to that the default spliced plot path does not conform to the plot logic rule, identifying a determination node that causes the default spliced plot path to be logically unreachable, and performing path splicing on the first plot path and the historical plot path based on the determination node and a superior-subordinate relationship between the current node and the target node, to obtain the target spliced plot path that conforms to the plot logic rule and satisfies the plot parameter condition;

updating the plot parameter corresponding to the target node based on the spliced plot path; and displaying the target spliced plot path on the graphical plot structure interface.

11. The computer-readable storage medium according to claim 10, wherein the performing the path splicing on the first plot path and the historical plot path based on a superior-subordinate relationship between the current node and the target node, to obtain the spliced plot path that conforms to the plot logic rule and satisfies the plot parameter condition comprises:

when the superior-subordinate relationship exists between the current node and the target node, performing depth-first search processing in plot nodes before the target node to obtain a plot splicing node that conforms to the plot logic rule, wherein plot nodes after the current node do not change the plot parameter of the current node; and generating the spliced plot path based on the plot splicing node;

when the superior-subordinate relationship does not exist between the current node and the target node, changing, based on a target plot parameter that causes the default spliced plot path to not conform to the plot logic rule, a plot node involving a change of the target plot parameter in the default spliced plot path to obtain the spliced plot path that conforms to the plot logic rule, wherein plot parameters in the spliced plot path other than the target plot parameter satisfy the plot parameter condition.

12. The computer-readable storage medium according to claim 11, wherein before the performing depth-first search processing in plot nodes before the target node to obtain a plot splicing node that conforms to the plot logic rule, the processor is further configured to implement:

obtaining read plot nodes after a target determination node, the target determination node being a plot node that causes the default spliced plot path to not conform to the plot logic rule and involving a determination of the target plot parameter, and the read plot nodes being plot nodes that have been reached; and the performing depth-first search processing in plot nodes before the target node to obtain plot splicing nodes that conform to the plot logic rule comprises:

performing the depth-first search processing in the read plot nodes after the target determination node to obtain the plot splicing node that conforms to the plot logic rule.

13. The computer-readable storage medium according to claim 12, wherein the performing the depth-first search processing in the read plot nodes after the target determination node to obtain the plot splicing node that conforms to the plot logic rule comprises:

removing plot nodes that are on the historical path among exit nodes of the target determination node to obtain remaining read plot nodes; and performing the depth-first search processing in the remaining read plot nodes to obtain the plot splicing node that conforms to the plot logic rule.

14. The computer-readable storage medium according to claim 12, wherein the performing the depth-first search processing in the read plot nodes after the target determination node to obtain the plot splicing node that conforms to the plot logic rule comprises:

detecting a number of recursions of the depth-first search processing;

when the number of recursions is fewer than a threshold, performing node determination processing on a current search node, the current search node being a plot node that the depth-first search processing reaches at a current moment, and a starting position of the depth-first search processing being a target exit node of the target determination node;

when the current search node fails the node determination processing, using a next exit node of the current search node as the current search node, incrementing the number of recursions, and performing the operation of detecting a number of recursions of the depth-first search processing;

when the current search node passes the node determination processing, performing plot logic verification on the current search node; when the current search node passes the plot logic verification, determining the current search node as the plot splicing node;

when the current search node fails the plot logic verification, using a next exit node of the current search node as the current search node, incrementing the number of recursions, and performing the operation of detecting a number of recursions of the depth-first search processing;

when the number of recursions reaches the threshold, detecting whether any of exit nodes of the current search node is on the historical plot path that reaches the target node;

when none of the exit nodes of the current search node is on the historical plot path, removing a recursive branch where the current search node is located;

when the exit nodes of the current search node comprise a target exit node on the historical plot path, performing the plot logic verification on the target exit node;

when the target exit node passes the plot logic verification, using the target exit node as the plot splicing node;

when the target exit node fails the plot logic verification, removing the recursive branch where the current search node is located.

15. The computer-readable storage medium according to claim 14, wherein the performing node determination processing on a current search node comprises:

when the current search node is the target node or is on the historical plot path, determining that the current search node passes the node determination processing; otherwise, determining that the current search node does not pass the node determination processing; and the performing plot logic verification on the current search node comprises:

performing path splicing on the first plot path and a historical path after the current search node to generate a temporary spliced path; and when the temporary spliced path conforms to the plot logic rule, determining that the current search node passes the plot logic verification;

otherwise, determining that the current search node does not pass the plot logic verification.

16. The computer-readable storage medium according to claim 12, wherein the generating the spliced plot path based on the plot splicing node comprises:

performing path splicing on the first plot path and a historical path after the plot splicing node on the historical plot path to generate the spliced plot path; or using the temporary spliced path that conforms to the plot logic rule as the spliced plot path.

17. The computer-readable storage medium according to claim 11, wherein the changing, based on a target plot parameter that causes the default spliced plot path to not conform to the plot logic rule, a plot node involving a change of the target plot parameter in the default spliced plot path to obtain the spliced plot path that conforms to the plot logic rule comprises:

marking the target plot parameter;

obtaining all intersection nodes of the first plot path and the historical plot path;

checking a parameter modification on a path interval between every two adjacent intersection nodes on the first plot path by checking whether a plot node in the path interval is associated with a value change operation performed on the marked target plot parameter;

when no plot node in the path interval is associated with the value change operation performed on the target plot parameter, using, in the target path interval, a path formed between adjacent intersection nodes on the first plot path that correspond to the target path interval;

when a plot node in the path interval is associated with the value change operation performed on the target plot parameter, using, in the target path interval, a path formed between adjacent intersection nodes on the historical plot path that correspond to the target path interval, to obtain an adjusted first plot path;

splicing the adjusted first plot path with the historical plot path after a last intersection node to obtain a replacing spliced path;

when the replacing spliced path conforms to the plot logic rule, determining the replacing spliced path as the spliced plot path, and stopping checking the parameter modification on a next path interval; and when the replacing spliced path does not conform to the plot logic rule, checking the parameter modification on the next path interval.

18. An electronic device comprising:

one or more processors; and a storage apparatus storing one or more programs that, when executed by the one or more processors, cause the one or more processors to implement:

displaying, in a graphical plot structure interface of a game application and based on a game play progress of a user, a plurality of nodes and paths indicating multiple branches of a game plot of the game application;

obtaining current node information comprising a first plot path that starts from a root node and reaches a current node and a plot parameter of the current node, the current node indicating a plot where the user is currently located, and the plot parameter reflecting a user gaming status of the user at the current node;

obtaining target node information in response to a plot jump instruction for a target node received on the graphical plot structure interface, the target node information comprising a plot parameter of the target node and a historical plot path by which the target node has been reached from the root node, the historical plot path and the first plot path having one or more intersection nodes, and the plot jump instruction instructing a plot to jump from the current node to the target node;

performing path splicing on the first plot path and the historical plot path according to a default splicing rule to obtain a default spliced plot path, wherein the default spliced plot path is formed by a current path and a partial historical plot path, the current path starts from the root node and follows the first plot path to reach a first intersection node of the one or more intersection nodes, and the partial historical plot path starts from the first intersection node and follows the historical plot path to reach the target node;

in response to that the default spliced plot path conforms to a plot logic rule and satisfies a plot parameter condition, using the default spliced plot path as a target spliced plot path;

in response to that the default spliced plot path does not conform to the plot logic rule, identifying a determination node that causes the default spliced plot path to be logically unreachable, and performing path splicing on the first plot path and the historical plot path based on the determination node and a superior-subordinate relationship between the current node and the target node, to obtain the target spliced plot path that conforms to the plot logic rule and satisfies the plot parameter condition;

updating the plot parameter corresponding to the target node based on the spliced plot path; and displaying the target spliced plot path on the graphical plot structure interface.

19. The device according to claim 18, wherein the performing the path splicing on the first plot path and the historical plot path based on a superior-subordinate relationship between the current node and the target node, to obtain the spliced plot path that conforms to the plot logic rule and satisfies the plot parameter condition comprises:

when the superior-subordinate relationship exists between the current node and the target node, performing depth-first search processing in plot nodes before the target node to obtain a plot splicing node that conforms to the plot logic rule, wherein plot nodes after the current node do not change the plot parameter of the current node; and generating the spliced plot path based on the plot splicing node;

when the superior-subordinate relationship does not exist between the current node and the target node, changing, based on a target plot parameter that causes the default spliced plot path to not conform to the plot logic rule, a plot node involving a change of the target plot parameter in the default spliced plot path to obtain the spliced plot path that conforms to the plot logic rule, wherein plot parameters in the spliced plot path other than the target plot parameter satisfy the plot parameter condition.

20. The device according to claim 19, wherein the changing, based on a target plot parameter that causes the default spliced plot path to not conform to the plot logic rule, a plot node involving a change of the target plot parameter in the default spliced plot path to obtain the spliced plot path that conforms to the plot logic rule comprises:

marking the target plot parameter;

obtaining all intersection nodes of the first plot path and the historical plot path;

checking a parameter modification on a path interval between every two adjacent intersection nodes on the first plot path by checking whether a plot node in the path interval is associated with a value change operation performed on the marked target plot parameter;

when no plot node in the path interval is associated with the value change operation performed on the target plot parameter, using, in the target path interval, a path formed between adjacent intersection nodes on the first plot path that correspond to the target path interval;

when a plot node in the path interval is associated with the value change operation performed on the target plot parameter, using, in the target path interval, a path formed between adjacent intersection nodes on the historical plot path that correspond to the target path interval, to obtain an adjusted first plot path;

splicing the adjusted first plot path with the historical plot path after a last intersection node to obtain a replacing spliced path;

when the replacing spliced path conforms to the plot logic rule, determining the replacing spliced path as the spliced plot path, and stopping checking the parameter modification on a next path interval; and when the replacing spliced path does not conform to the plot logic rule, checking the parameter modification on the next path interval.

\* \* \* \* \*